March 16, 1943.    R. W. SULLIVAN    2,313,844
METHOD OF PRECIPITATION

Filed Dec. 12, 1939

INVENTOR
Roy W. Sullivan
BY Edwin B. Connolly
ATTORNEY

Patented Mar. 16, 1943

2,313,844

UNITED STATES PATENT OFFICE 2,313,844

METHOD OF PRECIPITATION

Roy William Sullivan, Wilmington, Del., assignor to E. I. du Pont de Nemours & Company, Wilmington, Del., a corporation of Delaware Application December 12, 1939, Serial No. 308,756

7 Claims. (Cl. 23—66)

This invention relates to the art of metathesis. More particularly, it relates to the formation of solids by double decomposition of compounds in liquids. Still more particularly, it relates to an improved process for the precipitation of solids from liquids.

Precipitation procedures are used widely for the production of such commodities as blanc fixe, calcium sulfate, lithopone, calcium carbonate, numerous pigment colors, and many other water insoluble and slightly water-soluble materials. The usual method of producing such materials on the commercial scale is to add a liquid solution or suspension of one reacting compound through a pipe to a reacting liquor in a tank with such control of addition speed, reaction temperature, etc., as is necessary to obtain the physical condition desired in the precipitated materials. The precipitated solids are then usually removed from the mother liquors by filtration and are washed to remove undesirable soluble by-products and/or reactants, and are thereafter heat treated and wet and/or dry milled. In the case of blanc fixe, for example, sodium sulfate solution is added to barium sulfide solution or sulfuric acid is added to barium chloride solution in large agitated tanks. The precipitated barium sulfate is recovered by filtration and is washed as free as possible from the by-product sodium sulfide or hydrochloric acid. In the manufacture of calcium sulfate from hydrated lime and sulfuric acid, a suspension of the lime in water is added to the sulfuric acid solution and the resultant precipitated calcium sulfate is filtered and washed as free as possible from excess sulfuric acid. In the manufacture of lithopone, barium sulfide solution is reacted with zinc sulfate solution forming a precipitate of crude lithopone comprising barium sulfate and zinc sulfide in substantially equimolecular proportions intimately associated as a composite precipitate. Said crude lithopone slurry is adjusted to the desired pH by addition of small amounts of barium sulfide solution or zinc sulfate solution and is then filtered and the crude lithopone is calcined to develop its hiding power, is suddenly quenched, and is milled to form the finished lithopone of commerce.

The precipitation of crude lithopone has heretofore usually been accomplished by either a batch process, in which a predetermined amount of one of the solutions, preferably the zinc sulfate solution, is first introduced into a large precipitating tank and then a predetermined amount of the other solution is added with constant stirring, or by a simultaneous batch process in which both solutions are introduced simultaneously into a large precipitating tank at predetermined rates, or by a simultaneous continuous process in which the zinc sulfate and barium sulfide liquors are continuously added to a substantially constant volume of crude lithopone pulp in a precipitating tank, while crude pulp is continuously withdrawn from the tank. Other double decomposition precipitation reactions, such as the reactions between sodium sulfate and barium sulfide solutions, sulfuric acid and barium chloride solutions, sulfuric acid solution and aqueous lime suspension, ammonium sulfide and zinc sulfate solutions, zinc chloride and barium sulfide solutions, and barium sulfide and barium zincate solutions, and various reactions employed for the precipitation of calcium carbonate, numerous pigment colors, and many other water insoluble and slightly water-soluble materials, are accomplished by batch or continuous processes comparable to the hereinabove described crude lithopone precipitation processes.

The precipitation operation is one of the most important steps in the manufacture of such pigment materials as blanc fixe, calcium sulfate, lithopone, calcium carbonate, and the like, since it is the step which largely determines such important pigment properties as particle size, texture, etc. The precipitates formed by the usual prior art methods are flocculated to various degrees due to the extreme variations in local concentrations of the reacting liquors. These flocculates usually enclose portions of the reacting liquors and also of the reaction by-products, and thereby render complete reaction and easy washing impossible. In the case of the blanc fixe example cited, even exhaustive washing to an impractical degree fails to remove the sodium sulfide by-product completely. Furthermore, in the case of calcium sulfate formation from lime slurry and sulfuric acid, the extreme variations in local concentrations result in local alkalinity with consequent precipitation on the calcium sulfate of iron and other color imparting acid soluble impurities in the sulfuric acid. The hereinbefore mentioned flocculates also have deleterious effects on the physical properties of the final product. For example, in the case of lithopone they promote the formation of hard gritty aggregates during the later calcination step, thereby necessitating extensive milling to reduce them to the required fineness. Furthermore, in the precipitation of crude lithopone, as by a simultaneous batch process, in which both solutions are introduced into a large precipitating tank at predetermined rates, the concentrations of each reacting liquor at the moment of reaction vary over a very wide range. Starting with an empty tank and running in equimolecular proportions of zinc sulfate and barium sulfide solutions, it is obvious that when the tank is practically empty the concentrations of the reacting liquors are greater and the agitation more vigorous than when the tank is nearly filled with slurry toward the end of the precipitation operation. The concentration of the reacting liquors at the moment of reaction, which is determined by the concentration of said liquors entering the precipitating tank, by the position of the inlet pipes, by the composition of the precipitated crude lithopone slurry in said tank, and by the degree of agitation of said slurry, determines the character and particle size of the precipitate formed. As a consequence, the control of pigment material particle size in such prior art simultaneous batch processes is difficult, if not impossible. The resulting prior art pigment material consists of small particles formed during the first part of the precipitation operation, mixed with large particles formed toward the end of the precipitation, together with particles of optimum particle size formed during the portion of the precipitation operation when precipitation conditions are at an optimum. In practice it has been found that successive strikes made under apparently identical conditions produce pigment materials which vary considerably in particle size and result in finished pigment materials having widely different pigment properties.

This invention has as an object the improvement of the conditions of formation of solids from reacting liquors. A further object is the elimination of extreme variations in the local concentrations of the reacting liquors. A still further object is to improve the intimacy of contact between the reacting liquors. A still further object is the double decomposition of essentially all of the reactants. A still further object is the reduction of the flocculation and aggregation of the solid reaction products. A still further object is to improve the washing characteristics of the precipitated materials. A still further object is the provision of precipitated materials substantially free from impurities. A still further object is the improvement of the physical properties of the finished products. Additional objects will become apparent from an examination of the following description and claims.

These and other objects and advantages are accomplished by the following invention which broadly comprises forcing at least one of the reacting liquors through at least one restricted orifice under the surface of a body of liquor, said reacting liquor emerging from said orifice at a velocity of at least about 20 feet per second and at a rate per orifice per minute of less than about 5% of the volume of said body of liquor.

In a more restricted sense this invention comprises forcing a reacting liquor through a restricted orifice under the surface of a body of the other reacting liquor, said reacting liquor emerging from said orifice at a velocity of at least about 30 feet per second and at a rate per orifice per mniute of less than about 1% of the volume of said body of the other reacting liquor.

A preferred embodiment of this invention comprises forcing jets of the two reacting liquors, say sulfuric acid and barium chloride solution, through separate restricted orifices under the surface of a body of a slurry of the precipitate had as a result of the reaction between said reacting liquors, said jets emerging from said orifices at velocities of at least about 40 feet per second, and the volume of reacting liquor delivered per minute by each orifice not exceeding about 0.5% of the volume of said body of slurry.

In describing my invention in detail, I shall first describe the illustrated precipitation devices embodying it in its preferred forms so far as it relates to apparatus, but although I describe the invention by reference to such illustrated apparatus it will be understood that I do not restrict it thereto. In the accompanying drawing of these precipitation devices:

Number 1 in these figures is a container comprising a body of liquor 2. The reacting liquor is forced under pressure through restricted orifices 3, spaced below the surface of the liquor 2, said reacting liquor emerging from said orifices at a velocity of at least about 20 feet per second and at a rate per orifice per minute of less than about 5% of the volume of said body of liquor 2.

Figure 1:
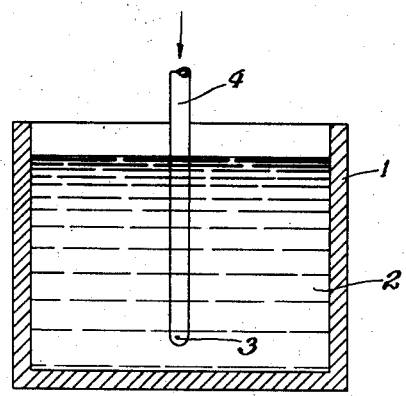
Figure 1 is a diagrammatic illustration of one arrangement of apparatus adapted for the practice of the invention in a batch precipitation operation.
Figure 2:
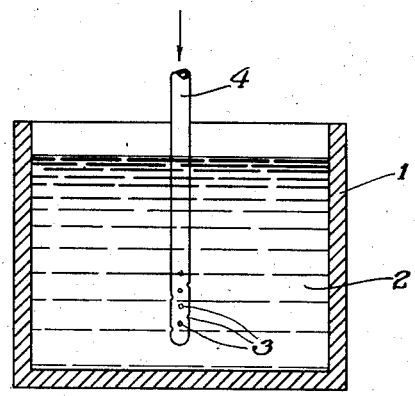
Figure 2 is a diagrammatic illustration of a slightly modified apparatus also adapted for a batch precipitation operation.

In practicing my invention in apparatus such as is illustrated in Figures 1 and 2, a predetermined amount of one of the reacting liquors is fed into tank 1. Subsequently, the other reacting liquor is forced through conduit 4 into orifices 3 from which it is forced under pressure into the liquor in reaction tank 1.

Figure 3:
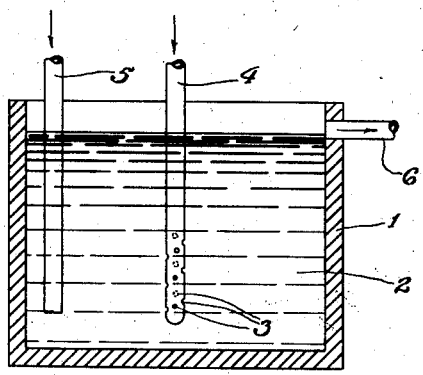
Figure 3 is a diagrammatic illustration of another arrangement of apparatus adapted for a simultaneous continuous precipitation operation.

In practicing my invention in apparatus such as is illustrated in Figure 3, wherein precipitation is effected by a simultaneous continuous operation, one of the reacting liquors is flowed continuously at a substantially constant rate into the reaction tank 1 through conduit 5 while the other reacting liquor is forced through conduit 4 and restricted orifices 3 into the reaction mixture 2. The reaction mixture level in tank 1 is always kept at a constant point, nearly tank full, and the suspension of reaction product or products is withdrawn continuously through the overflow launder 6.

Figure 4:
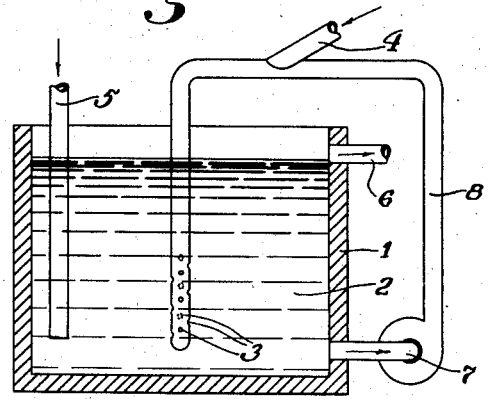
Figure 4 is a diagrammatic illustration of a slightly modified apparatus also adapted for a simultaneous continuous precipitation operation.

In practicing my invention in apparatus such as is illustrated in Figure 4, one of the reacting liquors is flowed continuously at a substantially constant rate into the mixing tank 1 through conduit 5, and the reaction mixture is forced by pump 7 at a substantially constant rate through conduit 8 while the other reacting liquor is forced through conduit 4 into conduit 8, the resultant mixture then being forced through orifices 3 into the reaction mixture 2. The reaction mixture level in the tank 1 is always kept at a constant point, nearly tank full, and the suspension of reaction products is withdrawn continuously through the overflow launder 6.

Figure 5:
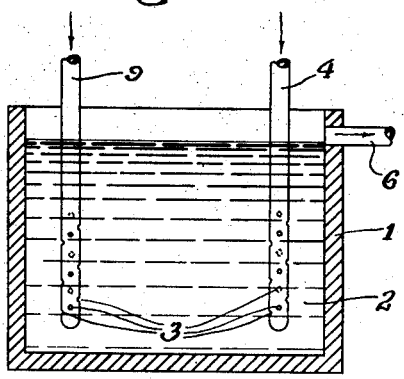
Figure 5 is a diagrammatic illustration of another arrangement of apparatus adapted for a simultaneous continuous precipitation operation wherein both reactants are forced through restricted orifices into the reaction tank.

In practicing my invention in apparatus such as is illustrated in Figure 5, which is particularly adapted for the precipitation of pigment materials, one of the reacting liquors is introduced through conduit 4 and the other reacting liquor through conduit 9 into restricted orifices 3 and 3, being forced under pressure into the reaction mixture 2. The reaction mixture level in the tank 1 is always kept at a constant point, nearly tank full, and the reaction product suspension is withdrawn continuously through the overflow launder 6.

Figure 6:
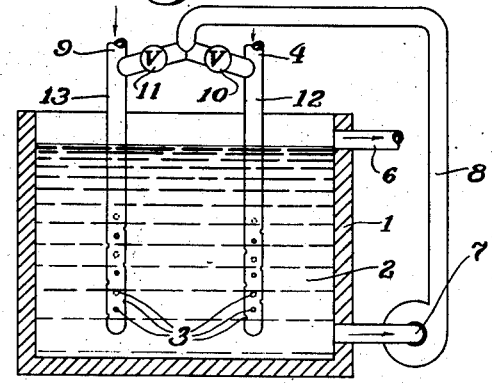
Figure 6 is a diagrammatic illustration of a slightly modified apparatus particularly adapted for simultaneous continuous precipitation of pigment materials, wherein both reactants are forced through restricted orifices into the reaction tank.

In practicing my invention in apparatus such as is illustrated in Figure 6, which is the preferred arrangement of apparatus for the precipitation of pigment materials, one reacting liquor is introduced through conduit 4 while the other reacting liquor is introduced through conduit 9. The reaction mixture 2 is forced by pump 7 at a predetermined rate through conduit 8 where a predetermined portion of the reaction mixture is forced through valve 10 and mixed in conduit 12 with one of the reacting liquors, and the remainder of the reaction mixture is forced through valve 11 and mixed in conduit 13 with the other reacting liquor, both mixtures then being forced through restricted orifices 3 and 3, into the reaction mixture 2. The reaction mixture level in the tank 1 is always kept at a constant point, nearly tank full, and the reaction product suspension is withdrawn continuously through the overflow launder 6.

Various arrangements and selections of equipment for the operation of my novel process are possible. In the preferred arrangement of apparatus for the precipitation of barium sulfate, illustrated in Figure 6, I employ a mixing tank 1 having a diameter of 32 inches and a capacity up to the overflow line of 127 gallons, other dimensions being proportionate as shown. The reaction mixture 2 is forced through pump 7 and valves 10 and 11 at substantially constant rates while barium chloride solution, at a substantially constant temperature, preferably in the range of from about 30° C. to about 45° C., containing a substantially constant amount of barium chloride, preferably in an amount equivalent to from about 45 to about 60 grams $Ba^{++}$ per liter, is flowed continuously at a substantially constant rate, preferably in the range of from about 60 to about 100 gallons per minute, through conduit 9 into conduit 13. Sulfuric acid at a substantially constant temperature, preferably room temperature, containing a substantially constant amount of $H_2SO_4$, preferably in the range of from about 1000 to about 1400 grams $H_2SO_4$ per liter, is flowed continuously into conduit 12 through conduit 4 at a substantially constant rate such that the overflow barium sulfate slurry comprises a slight excess of sulfuric acid, preferably an amount in the range of from about 0.01 to about 0.5 gram $H_2SO_4$ per liter. The mixtures in conduits 12 and 13 comprising barium sulfate slurry, and, respectively, sulfuric acid and barium chloride in excess, are forced through restricted orifices 3 and 3 at velocities of preferably at least about 40 feet per second and at rates per orifice per minute of preferably not more than about 0.5% of the volume of the reaction mixture 2. Barium sulfate slurry having a substantially constant temperature in the range of from about 45° C. to about 55° C. is allowed to overflow at a substantially constant rate through the overflow launder 6, where it is conducted to a finishing tank where it is then finished in the usual manner, being filtered, washed with water to a pH of not less than about 5, dried, and milled to provide an improved barium sulfate.

The following examples are given for illustrative purposes and are not intended to place any restrictions or limitations on the herein described invention.

*Example I*

Using an arrangement of apparatus designed as shown in Fig. 1 in which the mixing tank 1 was a 20 liter glass jar and conduit 4 was a 7 mm. glass tube having a restricted orifice, 500 cc. of commercial 76% sulfuric acid was forced at a rate of 50 cc. per minute and a velocity of 30 feet per second through said orifice into 16 liters of barium chloride solution containing 56 grams $Ba^{++}$ per liter, i. e., the sulfuric acid was forced into the barium chloride solution at a rate per orifice per minute of about 0.3% of the volume of said barium chloride solution. The resultant barium sulfate slurry was filtered, washed with water to a pH of 5, and was then blended with a slurry of good quality calcined wet-milled pigment titanium dioxide in the proportion of 30 parts by weight titanium dioxide to 70 parts by weight barium sulfate. The barium sulfate was uniformly small in particle size and substantially free from flocculates and occluded impurities. When washed on a filter it washed more slowly than did barium sulfate prepared by prior art processes, i. e. on account of its smaller particle size it prevented a rapid passage of the wash water through the filter cake, but after washing with a limited amount of water it was substantially free from residual impurities. When mixed with titanium dioxide as aforesaid, a blended pigment resulted having the desirably high oil absorption of 17 as determined by the oil absorption testing procedure more particularly described in U. S. Patent 2,125,342.

A second lot of barium sulfate was made from the same sulfuric acid and barium chloride solution and blended with the same pigment titanium dioxide under conditions identical with those existing during the preparation of the barium sulfate by my novel precipitation process, with the exception that during the precipitation operation the 7 mm. glass tube with restricted orifice was replaced by a large tube extending below the surface of the reaction mixture, according to prior art practice. Addition of the sulfuric acid was effected in a period of 10 minutes, i. e. at a 0.3% rate, but at a velocity of less than 10 feet per second. The resultant barium sulfate varied widely in particle size, its average particle size being substantially greater than that of the product of my novel process. Furthermore, said barium sulfate, prepared according to said prior art practice, was flocculated to a large extent and occluded substantial amounts of impurities. When washed on a filter it washed 10% more rapidly than did the barium sulfate of my novel process, but even after washing with large amounts of water it comprised substantial amounts of residual impurities. When mixed with titanium dioxide, a blended pigment resulted having the undesirably low oil absorption of 14.7.

*Example II*

Using an arrangement of apparatus designed as shown in Fig. 2 with the mixing tank 1 having a diameter of 12 feet 8 inches and a height of 9 feet 5 inches, 240 gallons of 25° C. sulfuric acid comprising 1303 grams $H_2SO_4$ per liter was forced at the rate of 12 gallons per minute through pipe 4 and two restricted orifices 3 and 3 in said pipe into 7960 gallons of barium chloride solution comprising 55 grams Ba++ per liter and having a temperature of 42° C., i. e., said sulfuric acid was forced through said orifices at a rate per orifice per minute of not more than 0.08% of the volume of the reacting liquor in tank 1. The sulfuric acid was forced through the aforementioned orifices at a velocity of 50 feet per second, said orifices being spaced below the surface of the barium chloride solution and being substantially equal in size. Upon completion of the sulfuric acid addition the resultant barium sulfate slurry had a temperature of 50° C. Said barium sulfate slurry was filtered, washed with water to a pH of 5, and was then blended with a slurry of good quality calcined wet-milled pigment titanium dioxide in the proportion of 30 parts by weight titanium dioxide to 70 parts by weight barium sulfate. The barium sulfate was uniformly small in particle size and substantially free from flocculates and occluded impurities. When washed on a filter it washed more slowly than did barium sulfate prepared by prior art processes, i. e., on account of its smaller particle size it prevented a rapid passage of the wash water through the filter cake, but after washing with a limited amount of water it was substantially free from residual impurities. When mixed with titanium dioxide as aforesaid, a blended pigment resulted having the desirably high oil absorption of 17.9 as determined by the oil absorption testing procedure more particularly described in U. S. Patent 2,125,342. Furthermore, substantially no separation of the titanium dioxide and barium sulfate occurred when a suspension of said blended pigment comprising 50 parts by weight pigment, 1.52 parts by weight sodium silicate (3.25 SiO₂.1Na₂O), and 510 parts by weight water, was agitated and allowed to stand for a period of 6 hours. Moreover, there was little if any tendency toward hard caking when paints comprising said blended pigment were stored in cans for a period of several months.

A second lot of barium sulfate was made from the same sulfuric acid and barium chloride solution and blended with the same pigment titanium dioxide under conditions identical with those existing during the preparation of the hereinabove described pigment material produced by my novel process, with the exception that during the precipitation operation the pipe 4 with its two restricted orifices was replaced by a large pipe extending below the surface of the reaction mixture according to prior art practice, and the sulfuric acid was introduced into the barium chloride solution at a velocity of 50 feet per second in a total period of about 20 seconds, i. e., at a rate per orifice per minute of about 9% of the volume of the reacting liquor in tank 1. The resultant barium sulfate varied widely in particle size, its average particle size being substantially greater than that of the product of my novel process. Furthermore, said barium sulfate, prepared according to said prior art practice, was flocculated to a large extent and occluded substantial amounts of impurities. When washed on a filter it washed 20% more rapidly than did the barium sulfate of my novel process, but even after washing with large amounts of water it comprised substantial amounts of residual impurities. When mixed with titanium dioxide, a blended pigment resulted having a low oil absorption of 14.5. Furthermore, when a suspension of said blended pigment comprising 50 parts by weight pigment, 1.5 parts by weight sodium silicate (3.25 SiO₂.1Na₂O), and 510 parts by weight water, was agitated and allowed to stand for a period of 6 hours, substantial separation of said blended pigment occurred, the barium sulfate fraction thereof settling much more rapidly than the titanium dioxide. Moreover, when paints comprising said blended pigment were stored in cans for a period of several months the barium sulfate fraction thereof settled to form hard cakes on the bottom of the cans which could only be reincorporated in said paints with difficulty.

*Example III*

Using an arrangement of apparatus designed as shown in Fig. 2 with the mixing tank 1 having a capacity of 10,000 gallons and with the conduit 4 having seventeen restricted orifices 3 of substantially equal size therein spaced below the surface of a body of 1900 gallons of 60° Bé. sulfuric acid in said tank, lime slurry comprising 18% CaO was added to said body of sulfuric acid, said lime slurry being forced through said orifices at a velocity of 100 feet per second at the rate of 155 gallons per minute in amount sufficient to neutralize 95% of said acid, i. e., said lime slurry was forced through said orifices at a rate per orifice per minute of not more than 0.48% of the volume of the body of reacting liquor in tank 1. The reaction mixture attained a maximum temperature of 125° C. during the lime slurry addition. After addition of said lime slurry the reaction mixture was diluted with water to provide a mixture comprising sulfuric acid in the amount of 12 grams H₂SO₄ per liter. The reaction mixture thus had, comprised calcium sulfate of which 95% was in the form of anhydrite while 5% was in the form of gypsum. Thereafter, the reaction mixture was boiled for a period of 1 hour whereupon substantially all of the gypsum in the said same was converted to anhydrite. The anhydrite slurry was filtered, washed with water to a pH of 5, and was then blended with a slurry of good quality calcined wet-milled pigment titanium dioxide in the proportion of 30 parts by weight titanium dioxide to 70 parts by weight calcium sulfate. The anhydrite was uniformly small in particle size and was substantially free from flocculates and occluded impurities. When washed on a filter it washed more slowly than did anhydrite prepared by prior art processes, i. e., on account of its smaller particle size it prevented a rapid passage of the wash water through the filter cake, but after washing with a limited amount of water it was substantially free from residual impurities. When mixed with titanium dioxide, as aforesaid, a blended pigment resulted having excellent color, and the desirably high oil absorption of 31.7 as determined by the oil absorption testing procedure more particularly described in U. S. Patent 2,125,342.

A second lot of anhydrite was made from the same lime slurry and sulfuric acid and blended with pigment titanium dioxide under conditions identical with those existing during the preparation of the hereinabove described pigment material by my novel process, with the exception that during the precipitation operation conduit 4 with its seventeen restricted orifices was replaced by a large tube extending below the surface of the reaction mixture according to prior art practice and the lime slurry was introduced into the sulfuric acid at a velocity of less than 10 feet per second and at a rate per orifice per minute of about 8% of the volume of said sulfuric acid. The resultant anhydrite comprised particles of widely varying sizes, its average particle size being markedly greater than that of the anhydrite produced by my novel process. Furthermore, said anhydrite, prepared according to said prior art practice, was badly flocculated and comprised substantial amounts of occluded impurities. When washed on a filter it washed more rapidly than did the anhydrite prepared by my novel process but even after washing with large amounts of water it comprised substantial amounts of residual impurities. When mixed with titanium dioxide a blended pigment resulted having poor color, and a low oil absorption of 26.8.

*Example IV*

Using an arrangement of apparatus designed as shown in Fig. 5 with the mixing tank 1 having a capacity up to the level of the overflow launder 6 of 127 gallons, 25° C. titanium sulfate hydrolysis residual liquor comprising 200 grams $H_2SO_4$ and 25 grams $Fe^{++}$ per liter was forced at a rate of 40 gallons per minute through conduit 4 while 25° C. lime slurry comprising 75 grams CaO per liter was forced at a rate of 60 gallons per minute through conduit 9. Conduit 4 contained thirty four restricted orifices 3 of substantially equal size spaced below the surface of the reaction mixture 2, while conduit 9 had fifty such orifices. The reacting liquors were forced through said orifices at a velocity of 150 feet per second, and at a rate per orifice per minute of not more than 0.95% of the volume of the body of reaction mixture 2. The gypsum slurry thereby produced was allowed to overflow at a substantially constant rate through the overflow launder 6. Said gypsum slurry was filtered and washed with water to a pH of 5. The gypsum was uniformly small in particle size, was of excellent color, and was substantially free from flocculates and occluded impurities. When washed upon a filter it washed more slowly than did gypsum prepared by prior art processes, but after washing with a limited amount of water it was substantially free from residual impurities.

A second lot of gypsum was made from the same titanium sulfate hydrolysis residual liquor and lime slurry under conditions identical with those existing during the preparation of the hereinabove described pigment material by my novel process, with the exception that during the precipitation operation conduits 4 and 9 with their restricted orifices were replaced by large tubes extending below the surface of the reaction mixture according to prior art practice and the reacting liquors were introduced into said reaction mixture at velocities of less than about 10 feet per second, the titanium sulfate hydrolysis residual liquor and the lime slurry being introduced into the body of reaction mixture 2 at rates per orifice per minute of, respectively, 31.5% and 47.25% of the volume of said body of reaction mixture. The resultant gypsum comprised particles of widely varying sizes, its average particle size being markedly greater than that of the gypsum had by my novel process. Furthermore, said gypsum, prepared according to said prior art practice, was badly flocculated and comprised substantial amounts of occluded impurities. When washed on a filter it washed more rapidly than did gypsum prepared by my novel process, but after washing with large amounts of water it still comprised substantial amounts of residual impurities, particularly basic compounds of iron precipitated on and in the gypsum particles as a result of extreme variations in local concentrations of the reacting liquors, more especially as a result of local alkalinity caused by excess lime slurry in localized portions of the reaction mixture. Said washed gypsum was yellow in color and quite unsuited for use as a pigment material.

*Example V*

Using an arrangement of apparatus designed as shown in Fig. 4 with the mixing tank 1 having a capacity up to the level of the overflow launder 6 of 127 gallons, 175.2 grams per liter barium sulfide solution was fed at a temperature of 78° C. through conduit 5 at a rate of 62.2 gallons per minute, while 350.9 grams per liter zinc sulfate solution at 50° C. was fed through conduit 4 at a rate of 29.6 gallons per minute, the reaction mixture 2 being forced through pump 7 and conduit 8 at a rate of 150 gallons per minute, and the resultant mixture of zinc sulfate solution and reaction mixture then being forced through thirty restricted orifices 3 of substantially equal size positioned beneath the surface of the reaction mixture 2. The mixture of zinc sulfate solution and reaction mixture 2 was forced through said orifices at a velocity of 150 feet per second and at a rate per orifice per minute of 4.7% of the volume of the body of reaction mixture 2. Crude lithopone pulp having a pH of 7 and a temperature of 81° C. was allowed to overflow at a substantially constant rate through the overflow launder 6. Said crude lithopone, which was uniform in particle size and white in color, was adjusted to a pH of 8.8 by addition of appropriate small amounts of barium sulfide solution. Subsequently it was filtered, dried to 5% moisture content, calcined at 870° C. in a furnace such as is described in U. S. Patent 1,584,381, and quenched by spraying with water and immediately thereafter dropping it into a quenching body of water. The calcined lithopone was wet milled, filtered, dried, and dry milled. The resultant finished lithopone was of excellent color and texture and was eminently suited for use in lithopone paint manufacture.

A second lot of lithopone was made from the same barium sulfide and zinc sulfate liquors under conditions identical with those existing during the preparation of the hereinabove described pigment by my novel process, with the exception that during the precipitation operation the tube with restricted orifices was replaced by a large tube extending below the surface of the reaction mixture according to prior art practice and the mixture of zinc sulfate solution and reaction mixture 2 was forced into the body of the reaction mixture 2 at a velocity of 50 feet per second and at a rate per orifice per minute of 140% of the volume of said body of reaction mixture. The resultant crude lithopone, prepared according to said prior art practice, varied widely in particle size, its average particle size being substantially greater than that of the product of my novel process. Furthermore, said prior art crude lithopone was flocculated to a large extent and occluded substantial amounts of unreacted reactants. Upon calcination and finishing it formed a finished lithopone pigment of poor color and texture.

It is to be understood that the hereinbefore described specific embodiments of my invention may be subject to variation and modification without departing from the scope thereof. For instance, while I prefer to employ a precipitating device such as that illustrated in Figure 6, other types of precipitating devices may be used. Thus, the precipitating devices illustrated in my drawing as well as others may be employed. While I ordinarily prefer to deliver the reacting liquor through a plurality of restricted orifices, it is to be understood that a single orifice may be employed for the delivery of said reacting liquor, as illustrated, for example, in Fig. 1. However, it is to be understood that in all instances said restricted orifice or orifices must be positioned below the surface of the body of liquor. Further, I have found it desirable that the cross-sectional area of the orifices should not exceed about 20 square inches, and preferably should not exceed about 2 square inches.

The velocity with which the reacting liquors are forced through the aforementioned orifices, the number and size of said orifices, and the rate of flow of said reacting liquors through said orifices are subject to relatively wide variance. Appreciable effects are had when said reacting liquor issues from said orifice at a velocity of about 20 feet per second and at a rate per orifice per minute equal to about 5% of the volume of the body of liquor into which said reacting liquor is forced. It is essential, however, that velocities substantially below about 20 feet per second and rates substantially in excess of about 5% should be avoided. While appreciable effects are obtained at velocities of about 20 feet per second it is recommended because of the superior results thereby obtained that the reacting liquor should issue from the aforementioned orifices at a velocity in excess of about 30 feet per second and preferably at a velocity in excess of about 40 feet per second. The term "rate of flow" as employed herein and in the appended claims is defined as the ratio of the volume of reacting liquor forced through one orifice in a period of 1 minute into the body of liquor to the volume of said body of liquor, and is expressed as per cent of the volume of said body of liquor. As hereinbefore stated, appreciable effects are obtained when the velocity of the reacting liquor emerging from the orifice and the size of said orifice are such that a rate of flow of about 5% is had. It is recommended, however, because of the superior results thereby obtained, that a rate of flow of not more than about 1% and preferably a rate of flow of not more than about 0.5% should be employed. When relatively low rates of flow (of the order of the lower portion of the range given) are employed, use of lower velocities (of the order of the lower portion of the range given) will be found to be more desirable, whereas with higher rates of flow higher velocities will be required.

While, as hereinbefore stated, the rate of flow of reacting liquor per orifice must be limited strictly, a plurality of said restricted orifices may be employed. When practicing my invention in a batch operation in apparatus such as is illustrated in Figs. 1 and 2, it is preferred that the reaction tank I should have a capacity of as high as about 2000 gallons or more. However, when employing my novel process in a simultaneous continuous precipitation operation in apparatus such as is illustrated in Figs. 3, 4, 5, and 6, it is preferred that the reaction tank I should have a capacity of not more than about 150 gallons, and further that the number of orifices should be such that the total volume of the reacting liquors entering said tank per minute should be not less than about 1/3 of the volume of said tank.

In practicing my invention it is found that introduction of a reacting liquor through a restricted orifice under the surface of a body of liquor at the velocities and rates of flow stated can be regarded as similar to atomizing a liquid in air. The effect can be demonstrated readily by introducing a colored liquid into a colorless one in the manner described. The colored liquid enters in a well spread fan shape and if mechanically agitated at the same time diffuses much more rapidly than by the ordinary method of addition.

While my invention is particularly adapted to the manufacture of pigment materials, for example, such pigment materials as barium sulfate, lithopone, zinc sulfide, calcium sulfate, calcium carbonate, and the like, it is to be understood that it is also adapted to many other double decomposition precipitation processes involving reactions between reacting liquors and the formation of substantially insoluble solids. The term "reacting liquor," as employed herein and in the appended claims, includes all mobile liquid systems comprising reacting compounds, and includes pure liquids such as, for example, water, solutions such as for example an aqueous solution of sodium sulfate, suspension such as for example an aqueous calcium hydroxide suspension, and dispersed sols such as for example a tin oxide sol; while the term "body of liquors" designates the body of reacting liquor or body of reaction mixture or body of slurry of reaction products into which said reacting liquor is forced under pressure and through restricted orifices.

Examples of solids contemplated for precipitation according to my invention, and of the reacting liquors employed in the precipitation thereof include, aluminum hydroxide precipitated by reaction between solutions of sodium aluminate and sulfuric acid; basic aluminum acetate by reaction between aluminum hydroxide slurry and acetic acid; aluminum abietate from solutions of aluminum sulfate and sodium abietate; aluminum palmitate from solutions of aluminum sulfate and sodium palmitate; aluminum stearate from solutions of aluminum sulfate and sodium stearate; golden antimony sulfide from solutions of sodium thioantimonate and sulfuric acid; barium carbonate from solutions of barium chloride and ammonium carbonate; barium chromate from solutions of barium nitrate and sodium chromate; barium fluoride from solutions of barium sulfide and hydrofluoric acid; barium fluosilicate from solutions of barium hydroxide and fluosilicic acid; barium sucrate from barium hydroxide solution and molasses; barium sulfate from a reacting liquor containing a barium compound and a reacting liquor containing a soluble sulfate, for example, a barium carbonate suspension and sulfuric acid, barium sulfide and sodium sulfate solutions, a barium chloride solution and sulfuric acid, barium chloride and sodium sulfate solutions, a barium peroxide suspension and sulfuric acid, a barium sulfide solution and sulfuric acid, and the like; bismuth beta-naphtholate from sodium beta-naphtholate solution and acetic acid solution of bismuth nitrate; bismuth subcarbonate from solutions of bismuth nitrate and ammonium carbonate; bismuth hydroxide from solutions of bismuth nitrate and sodium hydroxide; bismuth subnitrate by reaction between acidified bismuth nitrate solution and water; bismuth oxychloride by reaction between slightly acid bismuth chloride solution and water; bismuth oxyiodide by reaction beween slightly acid solution of bismuth iodide and water; bismuth subsalicylate from bismuth hydroxide slurry and salicylic acid; cadmium lithopone from solutions of cadmium sulfate and barium sulfide; calcium abietate from solutions of sodium abietate and calcium chloride; calcium arsenate from solutions of sodium arsenate and calcium chloride; calcium carbonate from a reacting liquor containing a calcium compound and a reacting liquor containing a soluble carbonate, for example, calcium chloride and sodium carbonate solutions, a calcium sulfate suspension and an ammonium carbonate solution, a calcium hydroxide suspension and a sodium carbonate solution, and the like; calcium lithopone from calcium sulfide suspension and zinc sulfate solution; calcium stearate from solutions of sodium stearate and calcium chloride; calcium sucrate from calcium hydroxide suspension and molasses; calcium palmitate from solutions of sodium palmitate and calcium chloride; dicalcium phosphate from solutions of disodium phosphate and calcium chloride; tricalcium phosphate from trisodium phosphate solution and ammonium hydroxide comprising calcium chloride solution; calcium sulfate from a reacting liquor containing a calcium compound and a reacting liquor containing a soluble sulfate, for example a calcium hydroxide suspension and sulfuric acid, a calcium sulfide suspension and sulfuric acid, a calcium carbonate suspension and sulfuric acid, calcium chloride and sodium sulfate solutions, and the like; satin white from calcium hydroxide suspension and aluminum sulfate solution; cobaltous hydroxide from solutions of cobaltous nitrate and sodium hydroxide; cobaltous linoleate from solutions of cobaltous chloride and sodium linoleate; cobaltous oleate from solutions of cobaltous chloride and sodium oleate; cobaltous resinate from solutions of cobaltous chloride and sodium resinate; cuprous cyanide from solutions of potassium cyanide and cupric sulfate; cuprous iodide from solutions of potaissum iodide and cupric sulfate; cupric oleate from solutions of cupric sulfate and sodium oleate; cupric resinate from solutions of cupric sulfate and sodium resinate; cupric stearate from solutions of cupric sulfate and sodium stearate; Paris green from suspensions of basic cupric acetate and arsenic trioxide; basic ferric acetate from ferric hydroxide suspension and acetic acid; ferric hypophosphite from solutions of sodium hypophosphite and ferric chloride; ferrous oxalate from solutions of ferrous sulfate and ammonium oxalate; ferrous oxide from ferrous oxalate suspension and potassium hydroxide solution; brown iron oxide from solutions of ferrous sulfate and sodium carbonate; yellow umber from ferrous sulfate solution and calcium hydroxide suspension; ferric phosphate from solutions of trisodium phosphate and ferric chloride; ferrous phosphate from solutions of ferrous sulfate and trisodium phosphate; ferric pyrophosphate from solutions of ferric citrate and tetrasodium pyrophosphate; ferrous ferrocyanide from solutions of ferrous sulfate and sodium ferrocyanide; lead arsenate from solutions of lead chloride and sodium arsenate; lead chromate from solutions of lead chloride and potassium dichromate; lead chloride from solutions of lead nitrate and hydrochloric acid; lead iodide from solutions of lead nitrate and potassium iodide; lead linoleate from solutions of lead nitrate and sodium linoleate; lead oleate from solutions of lead nitrate and sodium oleate; lead resinate from solutions of lead nitrate and sodium resinate; lead stearate from solutions of lead acetate and sodium stearate; lead sulfate from solutions of lead nitrate and sodium sulfate; lithium carbonate from solutions of lithium chloride and sodium carbonate; magnesium hydroxide from magnesium sulfate and sodium hydroxide solutions, magnesium chloride solution and calcium hydroxide suspension, and the like; magnesium palmitate from solutions of magnesium sulfate and sodium palmitate; magnesium stearate from solutions of magnesium sulfate and sodium stearate; magnesium sucrate from magnesium hydroxide suspension and molasses; manganese resinate from solutions of manganese sulfate and sodium resinate; manganese arsenate from solutions of sodium arsenate and manganese sulfate; manganese carbonate from solutions of manganese sulfate and sodium carbonate; manganese glycerophosphate from manganese hydroxide slurry and glycerophosphoric acid; manganese hydroxide from solutions of manganese sulfate and sodium hydroxide; manganese linoleate from solutions of manganese sulfate and sodium linoleate; mercuric iodide from solutions of mercuric chloride and potassium iodide; mercurous iodide from solutions of mercurous nitrate and potassium iodide; nickel carbonate from solutions of nickel sulfate and sodium carbonate; silver chloride from solutions of silver nitrate and sodium chloride; strontium sulfate from solutions of strontium sulfide and sulfuric acid; precipitated tin oxide from tin oxide sol and sulfuric acid solution; zinc abietate from solutions of zinc sulfate and sodium abietate; zinc arsenate from solutions of zinc sulfate and sodium arsenate; zinc arsenite from solutions of zinc sulfate and sodium arsenite; basic zinc carbonate from solutions of zinc sulfate and sodium carbonate; zinc chromate from solutions of zinc sulfate and potassium dichromate; zinc cyanide from solutions of zinc sulfate and potassium cyanide; zinc fluoride from solutions of zinc acetate and sodium fluoride; zinc palmitate from solutions of zinc sulfate and sodium palmitate; zinc stearate from solutions of zinc sulfate and sodium stearate; zinc sulfide from solutions of ammonium sulfide and zinc sulfate, zinc chloride and barium sulfide, barium sulfide and barium zincate, and the like; lithopone from solutions of barium sulfide and zinc sulfate; and, various reactions employed for the precipitation of numerous pigment colors, and other water insoluble and slightly water soluble materials. Furthermore, my invention may be employed in the preparation of treated pigment materials, as for example, in the preparation of silica coated lithopone by reacting sodium silicate solution and sulfuric acid in the presence of a lithopone slurry and thereby effecting precipitation of silica on the surface of the lithopone particles.

My process possesses advantages not previously combined in a single precipitation process. Furthermore, the precipitated products of my novel process possess advantages not previously combined in such precipitated commodities. On account of the reduction of the extreme variations in local concentrations of the reacting liquors, contamination of the precipitated solid material with soluble and/or insoluble reactants and/or by-products of the reaction is reduced markedly.

Because of the greater intimacy of contact between the reactants, metathesis may be carried essentially to completion. As a consequence, removal of reactants and by-products by washing of the filtered solid reaction product may be effected more readily. Furthermore, aggregation of the precipitated solid material is reduced and its particle size regulated with consequent control of the physical properties of the finished product.

As many apparently widely different embodiments of the invention may be made without departing from the scope and spirit thereof, it is to be understood that I do not limit myself to the specific embodiments thereof except as defined in the appended claims.

Having thus described the present invention the following is claimed as new and useful.

1. In a process for the production of solids from reacting liquors wherein one of the reactant liquors comprises a liquor body disposed in a relatively large precipitation zone the step which comprises forcing at least one of the reacting liquors under pressure through a plurality of small restricted orifices positioned below the surface of a body of liquor comprising another reacting liquor, said reacting liquor issuing from said orifices beneath the surface of said body of liquor at a velocity of at least about 40 feet per second, the volume of said reacting liquor issuing per orifice per minute being not greater than about 5% of the volume of said body of liquor, the velocity and the rate of flow of said reacting liquor being so regulated that the particle size and other characteristics of the resulting solid will be substantially uniform.

2. In a process for the production of solids from reacting liquors wherein one of the reactant liquors comprises a liquor body disposed in a relatively large precipitation zone the step which comprises forcing at least one reacting liquor containing a compound in solution under pressure through a plurality of small, restricted orifices positioned below the surface of a body of liquor comprising another reacting liquor, said reacting liquor issuing from said orifices beneath the surface of said body of liquor at a velocity of at least about 40 feet per second, the volume of said reacting liquor issuing per orifice per minute being not greater than about 5% of the volume of said body of liquor, the velocity and the rate of flow of said reacting liquor being so regulated that the particle size and other characteristics of the resulting solid will be substantially uniform.

3. In a process for the production of barium sulfate from a reacting liquor containing a barium compound and a reacting liquor containing a soluble sulfate the step which comprises forcing at least one of the reacting liquors under pressure through a plurality of small, restricted orifices positioned below the surface of a body of liquor comprising at least one of the reacting liquors, said reacting liquor issuing from said orifices beneath the surface of said body of liquor at a velocity of at least about 40 feet per second, the volume of said reacting liquor issuing per orifice per minute being not greater than about 5% of the volume of said body of liquor, the velocity and the rate of flow of said reacting liquor being so regulated that the particle size and other characteristics of the resulting solid will be substantially uniform.

4. In a process for the production of barium sulfate the step which comprises forcing a sulfuric acid solution under pressure through a plurality of small restricted orifices positioned below the surface of a body of liquor comprising barium chloride disposed within an enlarged precipitation tank, said solution issuing from said orifices beneath the surface of said body of liquor at a velocity of at least about 40 feet per second, the volume of said solution issuing per orifice per minute being not greater than about 5% of the volume of said body of liquor, the velocity and the rate of flow of said reacting liquor being so regulated that the particle size and other characteristics of the resulting solid will be substantially uniform.

5. In a process for the production of calcium sulfate from a reacting liquor containing a calcium compound and a reacting liquor containing a soluble sulfate the step which comprises forcing at least one of the reacting liquors under pressure through a plurality of small, restricted orifices positioned below the surface of a body of liquor comprising at least one of the reacting liquors, said reacting liquor issuing from said orifices beneath the surface of said body of liquor at a velocity of at least about 40 feet per second and while said body of liquor is disposed within a relatively large precipitation tank, the volume of said reacting liquor issuing per orifice per minute being not greater than about 5% of the volume of said body of liquor, the velocity and the rate of flow of said reacting liquor being so regulated that the particle size and other characteristics of the resulting solid will be substantially uniform.

6. In a process for the production of calcium sulfate the step which comprises forcing a calcium hydroxide suspension under pressure through a plurality of small restricted orifices positioned below the surface of a body of liquor comprising sulfuric acid disposed within a relatively large precipitation tank, said suspension issuing from said orifices beneath the surface of said body of liquor at a velocity of at least about 40 feet per second, the volume of said suspension issuing per orifice per minute being not greater than about 5% of the volume of said body of liquor, the velocity and the rate of flow of said reacting liquor being so regulated that the particle size and other characteristics of the resulting solid will be substantially uniform.

7. In a process for the production of calcium carbonate from a reacting liquor containing a calcium compound and a reacting liquor containing a soluble carbonate the step which comprises forcing at least one of the reacting liquors under pressure through a plurality of small restricted orifices positioned below the surface of a body of liquor comprising at least one of the reacting liquors, said reacting liquor issuing from said orifices beneath the surface of said body of liquor while said liquor body is disposed within a relatively large precipitation tank at a velocity of at least about 40 feet per second, the volume of said reacting liquor issuing per orifice per minute being not greater than about 5% of the volume of said body of liquor, the velocity and the rate of flow of said reacting liquor being so regulated that the particle size and other characteristics of the resulting solid will be substantially uniform.

ROY WILLIAM SULLIVAN.